3,241,972
GELATIN COMPOSITIONS

Burton D. Wilson, Rochester, N.Y., assignor to Eastman Kodak Company, Rochester, N.Y., a corporation of New Jersey
No Drawing. Filed May 28, 1963, Ser. No. 283,722
8 Claims. (Cl. 96—111)

This invention relates to the hardening of gelatin to enhance its resistance to water by incorporating therein certain bishalomethyl esters.

In the use of geltin for photographic purposes the gelatin is often treated with a succession of aqueous baths which vary in pH or which have raised temperatures. A great deal of work has been done on improving the resistance of gelatin to water so that swelling or melting of gelatin does not occur upon treatment with aqueous solutions in processing operations or in hot drying.

Various materials have been suggested as gelatin hardeners but in many instances compounds which harden gelatin also exhibit unwanted photographic effects; for instance, some aldehyde type hardeners have shown a tendency to increase fogging of the emulsion. Other types of hardeners tend to cause loss of speed of the emulsion upon storage. It is desirable that hardeners for gelatin, particularly those used in photographic emulsions, should not adversely affect the photographic characteristics of the emulsion. This also extends to photographic gelatin layers which may contact the emulsion layers in use.

One object of my invention is to provide hardeners for gelatin which do not exhibit detrimental photographic effects. Another object of my invention is to provide materials which when mixed with gelatin will render the gelatin resistant to the effects of water at varying pH or at elevated temperatures. A further object of my invention is to provide certain bishalomethyl esters which are useful as hardeners for gelatin. Other objects of my invention will appear herein.

I have found that certain compounds cenveniently derived from dibasic acids exhibit good hardening characteristics when incorporated in gelatin compositions. These compounds which are useful as gelatin hardeners have the following structure:

$$XCH_2O\overset{O}{\underset{\|}{C}}-M-\overset{O}{\underset{\|}{C}}-OCH_2X$$

wherein X is chlorine or bromine and M may be either a connecting bond or a divalent radical. For instance, M may be an alkylene chain of 1–10 carbon atoms which may be unsubstituted or may be substituted with simple alkyl groups such as methyl, ethyl, propyl, or the like. This chain may be for instance a polymethylene chain such as would result from using pimelic acid or azelaic acid as the starting material in preparing the halobismethyl ester. M is not restricted to an aliphatic chain but could be phenylene, cycloaliphatic, heterocyclic, an unsaturated carbon chain or a hetero chain connecting the carboxylic groups of the ester.

These compounds may be conveniently prepared by the condensation of an appropriate acid halide with formadehyde as illustrated by the following examples.

Example 1

A preparation was carried out following the procedure prescribed by Rosanti and Bouet (see Chem. Abstr., 47, 7437c, 1953). The product was distilled using a diffusion pump and had a boiling point of approximately 80° at 8 microns pressure. The product obtained was bis(chloromethyl) adipate.

Example 2

A procedure like that of Example I was used except that diethylmalonyl chloride was employed as the starting material. The reaction began when the mixture was warmed to 80° C. The crude material on distillation gave about 4% crystals, which were recrystallized from ether-petroleum ether. The product, bis(chloromethyl) diethylmalonate, had a melting point of 75–76° C.

Example 3

The procedure described in Example 1 was used except that sebacoyl chloride was employed as the acid chloride. The crude material was crystallized from petroleum ether. There was obtained bis(chloromethyl) sebacate having a melting point within the range of 36–50° C.

The compounds prepared in the preceding examples were added to separate portions of a high-speed silver bromoiodine emulsion which had been panchromatically sensitized with a cyanine dye. Each emulsion sample was coated on a cellulose acetate film support at a coverage of 432 mg. of silver and 980 mg. of gelatin per square foot. A sample of each film coating was exposed on an Eastman 1B sensitometer, processed for five minutes in Kodak DK–50 developer, fixed, washed, and dried with the following results:

| Hardener Used | Conc., g./100 g. of gel | Rel. Speed | Gamma | Fog | Percent Swell in Water [1] |
|---|---|---|---|---|---|
| Control | | 100 | 1.60 | 0.13 | 614 |
| Example 1 product | 1.0 | 87 | 1.53 | .11 | 541 |
| Example 1 product | 5.0 | 71 | 1.32 | .10 | 344 |
| Control | | 100 | 1.33 | .12 | 805 |
| Example 2 product | 3.0 | 80 | 1.32 | .08 | 440 |
| Control | | 100 | 1.15 | .13 | 640 |
| Example 3 product | 4.0 | 73 | 1.18 | .07 | 480 |
| Example 3 product | 8.0 | 71 | 1.10 | .06 | 310 |

[1] Vertical swell in water without processing.

Even small porportions of hardener in accordance with my invention, such as 0.1%, exhibit some hardening effect on the gelatin but is ordinarily desirable to employ at least 0.5% for the best effects. However, my invention, includes, in addition to the novel compounds which I have described, the use of a hardening amount thereof in gelatin compositions.

It will be noted that in the case of each of the samples, the fog values were better than those of the corresponding samples which had not been supplied with hardener thereby showing the antifogging tendency in accordance with my invention.

I claim:

1. A gelatin composition containing therein a hardening amount of a bishalomethyl ester having the structure

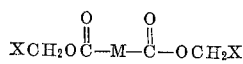

in which X is a substituent selected from the group consisting of chlorine and bromine and M is a structure linking the two esterified carboxyl groups.

2. Claim 1 in which M is an alkylene chain of 1–10 carbon atoms.

3. Claim 1 in which M is a bond.

4. Claim 1 in which M is a divalent radical.

5. A gelatin-silver halide photographic emulsion containing therein a hardening amount of a bishalomethyl ester having the structure

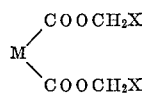

in which X is a substituent selected from the group consisting of chlorine and bromine and M is a divalent radical.

6. A gelatin composition containing therein a hardening amount of bis(chloromethyl) sebacate.

7. A gelatin composition containing therein a hardening amount of bis(chloromethyl) diethylmalonate.

8. A gelatin composition containing therein a hardening amount of bis(chloromethyl) adipate.

References Cited by the Examiner

UNITED STATES PATENTS

| | | | |
|---|---|---|---|
| 2,403,804 | 7/1946 | Kesslin et al. | 260—485 |
| 2,513,504 | 7/1950 | McFarlane et al. | 260—485 |
| 2,584,846 | 2/1952 | Cusic et al. | 260—485 |
| 2,726,162 | 12/1955 | Allen et al. | 106—125 |
| 2,732,303 | 1/1956 | Morgan et al. | 96—111 |
| 2,899,327 | 8/1959 | Christopher et al. | 106—125 |
| 2,992,109 | 7/1961 | Allen | 96—111 |
| 2,994,611 | 8/1961 | Heyna et al. | 96—111 |

FOREIGN PATENTS 1,113,807  9/1961  Germany.

NORMAN G. TORCHIN, *Primary Examiner.*